United States Patent
Hyun et al.

(10) Patent No.: US 12,464,042 B2
(45) Date of Patent: Nov. 4, 2025

(54) PEER IN HYBRID PEER-TO-PEER NETWORK AND METHOD OF SETTING PATH BETWEEN PEERS AND METHOD OF COMMUNICATING BETWEEN PEERS

(71) Applicant: ELECTRONICS AND TELECOMMUNICATIONS RESEARCH INSTITUTE, Daejeon (KR)

(72) Inventors: Wook Hyun, Daejeon (KR); Changkyu Lee, Daejeon (KR); Mi Young Huh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/414,692

(22) Filed: Jan. 17, 2024

(65) Prior Publication Data

US 2024/0333791 A1    Oct. 3, 2024

(30) Foreign Application Priority Data

Apr. 3, 2023    (KR) .......................... 10-2023-0043512

(51) Int. Cl.
*H04L 67/104* (2022.01)
*H04L 45/00* (2022.01)
(Continued)

(52) U.S. Cl.
CPC .......... *H04L 67/1048* (2013.01); *H04L 45/02* (2013.01); *H04L 45/18* (2013.01); *H04L 45/22* (2013.01); *H04L 45/24* (2013.01)

(58) Field of Classification Search
CPC ......... H04L 45/02; H04L 45/18; H04L 45/22; H04L 45/24; H04L 67/1048
See application file for complete search history.

(56) References Cited

U.S. PATENT DOCUMENTS 8,321,539 B2 * 11/2012 Ahn ..................... H04L 67/1093
                                                    709/220
8,381,013 B2    2/2013 Zheng
(Continued)

FOREIGN PATENT DOCUMENTS

| CN | 111541733 B | 9/2022 |
| EP | 2 003 845 B1 | 7/2015 |
| JP | 2009-117944 A | 5/2009 |
| JP | 2009-246698 A | 10/2009 |
| KR | 10-2021-0038281 A | 4/2021 |

OTHER PUBLICATIONS

Yuh-Jzer Joung and Zhang-Wen Kin. "On the self-organization of a hybrid peer-to-peer system", Journal of Network and Computer Applications 33 (2010) 183-202, 20 pages. (Year: 2010).*
(Continued)

*Primary Examiner* — G. C. Neurauter, Jr.

(57) ABSTRACT

A method of setting a path between peers included in a hybrid P2P network is disclosed. The method comprises transmitting, by a first peer, a primary path setting message for setting a primary path between the first peer and a second peer to the second peer; transmitting, by the second peer, a response message to the primary path setting message including information about a third peer, which is a parent peer of the second peer having a primary path relationship with the second peer, to the first peer; and transmitting one or more messages for setting a vertical candidate path with the third peer between the first peer and the third peer using the information about the third peer.

14 Claims, 15 Drawing Sheets

(51) Int. Cl.
*H04L 45/02* (2022.01)
*H04L 45/18* (2022.01)
*H04L 45/24* (2022.01)

(56) References Cited

U.S. PATENT DOCUMENTS

| | | | |
|---|---|---|---|
| 9,276,808 B2 | 3/2016 | Mäenpää et al. | |
| 11,863,621 B2 * | 1/2024 | Mikonis | H04L 43/0864 |
| 2021/0099384 A1 * | 4/2021 | Hyun | H04L 67/141 |
| 2021/0314399 A1 * | 10/2021 | Hyun | H04L 67/1095 |

OTHER PUBLICATIONS

International Telecommunication Union. "Hybrid peer-to-peer communications: Functional architecture", Series Q: Switching and Signalling, and Associated Measurements and Tests: Protocols and signalling for peer-to-peer communications, ITU-T Recommendation Q.4100 (Sep. 2020), 24 pages. (Year: 2020).*

International Telecommunication Union. "Hybrid peer-to-peer (P2P) communications: Tree and data recovery procedures", Series Q: Switching and Signalling, and Associated Measurements and Tests: Protocols and signalling for peer-to-peer communications, ITU-T Recommendation Q.4101 (Aug. 2021), 23 pages. (Year: 2021).*

Eng Keong Lua et al. "A Survey and Comparison of Peer-to-Peer Overlay Network Schemes", IEEE Communications Surveys and Tutorials, Second Quarter 2005, vol. 7, No. 2, 22 pages. (Year: 2005).*

Hatem Ismail et al., "A Composite Malicious Peer Eviction Mechanism for Super-P2P Systems," IEEE, 2018.

Feng Wang et al., "A High-Feasibility Secure Routing against Malicious Peer in Structured P2P", Mathematical Problems in Engineering, 2022.

Hatem Ismail et al., "Malicious peers eviction for P2P overlays," IEEE, 2016.

* cited by examiner

FIG. 10

| Syntax | Description |
|---|---|
| {<br>  "req-code ": NUMBER,<br>  "req-params": {<br>    "operation": {<br>      "overlay-id": STRING,<br>      "conn_num": NUMBER,<br>      "ttl": NUMBER,<br>      "recovery": BOOLEAN,<br>      "vertical-candidate":<br>      BOOLEAN,<br>    }<br>    "peer": {<br>      "peer-id": STRING,<br>      "address": STRING,<br>      "ticket-id": NUMBER<br>    }<br>  }<br>} | - req-code indicates the type of the request message. In case of a HELLO_PEER request message, req-code value is set as 1.<br>- overlay-id indicates an identifier of the overlay network that the new peer wants to participate.<br>- conn_num indicates the number of connections that the new peer wants to establish with other peers.<br>- ttl indicates the number of steps of the message the peer wants to pass on to. The new participating peer specifies the initial ttl value, and the peer receiving the HELLO_PEER message reduces the ttl value by one when forwarding the message.<br>- recovery is used when an emergency recovery is needed. If a new peer joins the overlay network for the first time, this field is not used.<br>- vertical-candidate is used to request the creation of a vertical candidate path, which requires the 'ttl' parameter to be included<br>- peer-id indicates the identifier of the new participating peer.<br>- address indicates network address information of new participating peer that can be accessed by other peers.<br>- ticket-id indicates the ticket-id value for the new participating peer. ticket-id, a value that indicates the order of peer joined to the hybrid overlay network, which is taken from the HOMS defined in [ITU-T Q.4100]. This means a peer with a low ticket-id value has first joined the corresponding overlay network. When recovering from an overlay network problem, a ticket ID plays an important role in preventing a loop by causing the peer with a large ticket ID value to attempt recovery of a broken connection. |

FIG. 11

| Syntax | Description |
|---|---|
| {<br>  "req-code": NUMBER,<br>  "req-params": {<br>    "operation": {<br>      "overlay-id": STRING<br>    }<br>    "allow-primary-req":<br>                BOOLEAN,<br>    "peer": {<br>      "peer-id": STRING,<br>      "ticket-id": NUMBER<br>    }<br>  }<br>} | - req-code indicates the type of the request message. In case of an ESTAB_PEER request message, req-code value is set as 2.<br>- overlay-id indicates the identifier of an overlay network.<br>- When allow-primary-req is set to false, the switch to the path as primary is not allowed. In this case, the peer that receives this request will not send a SET_PRIMARY message, and the path will remain as a candidate path. However, despite not being allowed to switch to the primary path on receiving this message, this candidate path will have the highest priority if the primary path with the parent peer fails.<br>- peer-id indicates the identifier of the peer sending an ESTAB_PEER request.<br>- ticket-id indicates the ticket-id value of the peer sending the ESTAB_PEER request message. ticket-id is assigned from the HOMS through the HybridOverlayJoin message defined in [ITU-T Q.4103]. |

FIG. 12

| Syntax | Description |
|---|---|
| {<br>  "rsp-code": NUMBER,<br>  "rsp-params": {<br>    "buffermap": PEER_BUFFERMAP,<br>    "parent-peer": {<br>      "peer-id": STRING,<br>      "address": STRING<br>    }<br>  }<br>} | - rsp-code indicates which response message is for which request. In case of a SET_PRIMARY response message, it is possible to have the 4200 or 4603 as a rsp-code value.<br>- rsp-code value 4200 is a combination of the request type (4) and response type (200). Therefore, rsp-code value 4200 means an 'OK' response to the SET_PRIMARY request message.<br>- rsp-code value 4603 is a combination of the request type (4) and response type (603). Therefore, rsp-code value 4603 is a 'decline' response to the SET_PRIMARY request message. Response type 603 is set when the corresponding peer receiving the SET_PRIMARY request cannot establish a primary connection with the requesting peer due to internal problems.<br>- buffermap indicates the caching buffer status of the corresponding peer.<br>- parent-peer includes the peer-id of the outgoing primary path(parent peer) that has a lower ticket-id than this peer. |

FIG. 13

| Syntax | Description |
|---|---|
| {<br>  "req-code": NUMBER,<br>  "req-params": {<br>    "operation": {<br>      "ack": BOOLEAN<br>    }<br>    <u>"candidate-path"</u><br>BOOLEAN<br>    "peer": {<br>      "peer-id": STRING,<br>      "sequence": NUMBER<br>    }<br>    "payload": {<br>      "length": NUMBER,<br>      "content-type": STRING<br>    }<br>  }<br>} | - req-code indicates the type of the request message. In case of the BROADCAST_DATA request message, req-code value is set as 6.<br>- ack has a TRUE value if requesting peer wants to receive a response message. The default value is FALSE.<br>- <u>candidate-path is set to TRUE, if BROADCAST_DATA request message needs to be delivered through both the primary path and candidate path. The default value is FALSE.</u><br>- peer-id indicates the ID of the peer that initially generated this BROADCAST_DATA request message, and it is possible to identify who created and sent this data for the first time.<br>- Whenever self-generated data is sent through the BROADCAST_DATA message, the value of the sequence field is increased by 1 and allocated. When forwarding data is received from another peer, this value of the sequence field is not modified.<br>- length indicates the length of the data that is carried and is described in bytes<br>- content-type indicates the kind of data that is carried. It is described as the MIME type such as application/JSON, application/XML, etc. The processing of content according to content-type depends on the application using the peer protocol. |

PEER IN HYBRID PEER-TO-PEER NETWORK AND METHOD OF SETTING PATH BETWEEN PEERS AND METHOD OF COMMUNICATING BETWEEN PEERS

CROSS-REFERENCE TO RELATED APPLICATIONS

This application claims priority to Korean Patent Application No. 10-2023-0043512, filed on Apr. 3, 2023, with the Korean Intellectual Property Office (KIPO), the entire contents of which are hereby incorporated by reference.

BACKGROUND

1. Technical Field

Disclosure of the present invention relates to a peer in a hybrid peer-to-peer (P2P) network and a path setting method of enhancing stability between peers, and more particularly, to a technique for restoring a network while removing a malignant peer or minimizing deformation of the network when a peer leaves the network.

2. Related Art

The contents described in this section merely provide background information on the present embodiment and do not constitute the related art.

An overlay network is a network in which another network is layered on top of an existing network, and is a virtual network formed by configuring separate nodes and logical links on top of the existing network. Such an overlay network can provide more efficient network services by utilizing an existing network to increase scalability.

In a tree-based overlay network, a scheme in which one or a small number of source terminals transmit data to a plurality of receiver terminals in a relay form is used.

In Korean Laid-open Patent Application No. 10-2021-0038281 "Peer and Operation Method of Peer," which is a related art document, when there is an overlay network participation request from a peer, a peer list may be received from a hybrid overlay management server (HOMS), a first peer may be selected from the received peer list, a connection may be established with the selected first peer, and a connection may be established with one or more of second peers.

Propagation of the overlay network participation request may be initiated by the selected first peer. Peers that receive the participation request from the first peer may be considered to be second peers.

One of the established connections may be determined as a primary path, and a candidate path may be set to prepare for loss of the primary path.

The setting of the candidate path may provide a way to restore the network when a problem occurs in the primary path, but a more efficient protocol is required to respond to various situations in which peers constituting the primary path leave the network.

SUMMARY

Accordingly, example embodiments of the present invention are provided to substantially obviate one or more problems due to limitations and disadvantages of the related art.

Example embodiments of the present invention may provide a protocol that can solve problems that may occur in an entire service when a peer does not maliciously propagate data and messages to other peers.

Example embodiments of the present invention may also provide a protocol that provides a function for safely removing a specific peer located inside a hybrid overlay network.

In the case in which a peer located inside a hybrid overlay network leaves the network or is expelled from the network, when a lost path is restored with an increment of a data transmission path, the quality of service may be degraded. Example embodiments of the present invention may also provide a protocol in which an increase in data transmission path is prevented by restoring a lost path while maintaining a basic structure of a hierarchy and an efficient service is provided.

According to an embodiment of the present disclosure, a method of setting a path between peers included in a hybrid peer-to-peer (P2P) network, which is a path setting method performed in at least one peer included in the P2P network is disclosed. The method according to the embodiment of the present disclosure comprises: transmitting, by a first peer, a primary path setting message for setting a primary path between the first peer and a second peer to the second peer; transmitting, by the second peer, a response message to the primary path setting message including information about a third peer, which is a parent peer of the second peer having a primary path relationship with the second peer, to the first peer; and transmitting one or more messages for setting a vertical candidate path with the third peer between the first peer and the third peer using the information about the third peer.

The transmitting of the one or more messages between the first peer and the third peer may include: transmitting, by the first peer, a first message including a vertical candidate path parameter with the third peer to the third peer; and transmitting, by the third peer, a second message to the first peer in response to the first message.

The transmitting of the one or more messages between the first peer and the third peer further may include, when the first peer receives the second message, transmitting a vertical candidate path setting message for setting the vertical candidate path with the third peer to the third peer.

In the second message, a value of a field related to the primary path may be set to a value corresponding to "negative" to prevent a loop between the first peer, the second peer, and the third peer from being formed.

The method according to the embodiment of the present disclosure may further comprise, when the first peer receives the second message and all of candidate paths in a candidate path pool of the first peer are occupied, terminating any one of a plurality of preset candidate paths to set the vertical candidate path between the first peer and the third peer.

The method according to the embodiment of the present disclosure may further comprise setting the vertical candidate path between the first peer and the third peer as a first-priority candidate of a new primary path for replacing the primary path between the first peer and the second peer in a case in which the second peer leaves the network or is expelled from the network.

The method according to the embodiment of the present disclosure may further comprise sharing, by the second peer, the primary path setting message with one or more peers having the primary path relationship with the second peer.

In the transmitting of the primary path setting message to the second peer, the second peer from among one or more peers having candidate paths with the first peer may be determined as a counterpart peer on the primary path, and the primary path setting message may be transmitted to the second peer.

The method according to the embodiment of the present disclosure may further comprise: transmitting, by the third peer, an expulsion notification message for the second peer to the first peer and the second peer; checking, by the first peer, whether the expulsion notification message for the second peer has been redundantly received from the second peer based on a sequence number of the expulsion notification message for the second peer; when it is determined that the expulsion notification message is a normal message and is not received redundantly, updating, by the first peer, the sequence number of the expulsion notification message to a latest sequence number and storing the latest sequence number; and transmitting, by the first peer, the expulsion notification message for the second peer to all remaining peers among peers having a primary path relationship and a candidate path relationship with the first peer, except for peers on the path through which the expulsion notification message for the second peer has already been transmitted.

The method according to the embodiment of the present disclosure may further comprise selecting, by the first peer, the vertical candidate path between the first peer and the third peer as a new primary path that replaces the primary path between the first peer and the second peer and transmitting a second primary path setting message for setting the primary path between the first peer and the third peer to the third peer.

The method according to the embodiment of the present disclosure may further comprise transmitting, by the third peer, a response message to the second primary path setting message including information about a fourth peer, which is a parent peer of the third peer having a primary path relationship with the third peer, to the first peer.

According to an embodiment of the present disclosure, a method of setting a path between peers included in a hybrid peer-to-peer (P2P) network, which is a path setting method performed in a peer included in the P2P network is disclosed. The method according to the embodiment of the present disclosure comprises: transmitting, by a first peer, a primary path setting message for setting a primary path between the first peer and a second peer to the second peer; receiving, by the first peer, a response message to the primary path setting message from the second peer; and transmitting, by the first peer, one or more messages for setting a vertical candidate path with a third peer to the third peer using information about the third peer included in the response message, wherein the third peer is a parent peer of the second peer having a primary path relationship with the second peer.

The transmitting of the one or more messages to the third peer may include: transmitting a first message including a vertical candidate path parameter with the third peer to the third peer; and receiving a second message from the third peer in response to the first message.

The transmitting of the one or more messages to the third peer may further include, when the first peer receives the second message, transmitting a vertical candidate path setting message for setting the vertical candidate path with the third peer to the third peer.

The method according to the embodiment of the present disclosure may further comprise, when the first peer receives the second message and all of candidate paths in a candidate path pool of the first peer are occupied, terminating any one of a plurality of preset candidate paths to set the vertical candidate path between the first peer and the third peer.

The method according to the embodiment of the present disclosure may further comprise: receiving, by the first peer, an expulsion notification message for the second peer from the third peer; checking, by the first peer, whether the expulsion notification message for the second peer has been redundantly received from the second peer; and transmitting, by the first peer, the expulsion notification message for the second peer to all remaining peers among peers having a primary path relationship and a candidate path relationship with the first peer, except for peers on the path through which the expulsion notification message for the second peer has already been transmitted.

According to an embodiment of the present disclosure, a peer included in a hybrid peer-to-peer (P2P) network is disclosed. The peer according to the embodiment of the present disclosure comprises: a memory configured to store at least one instruction; and a processor configured to execute the at least one instruction, wherein the processor, by executing the at least one instruction, is configured to: transmit, as a first peer in the hybrid P2P network, a primary path setting message for setting a primary path between the first peer and a second peer in the hybrid P2P network to the second peer, receive a response message to the primary path setting message from the second peer, and transmit one or more messages for setting a vertical candidate path with a third peer to the third peer using information about the third peer included in the response message, wherein the third peer is a parent peer of the second peer having a primary path relationship with the second peer.

The processor may be further configured to transmit a first message including a vertical candidate path parameter with the third peer to the third peer, and receive a second message from the third peer in response to the first message.

The processor may be further configured to terminate any one of a plurality of preset candidate paths, in order to set the vertical candidate path between the first peer and the third peer when the first peer receives the second message and all of candidate paths in a candidate path pool of the first peer are occupied.

The processor is further configured to: receive an expulsion notification message for the second peer from the third peer, check whether the expulsion notification message for the second peer has been redundantly received from the second peer, and transmit the expulsion notification message for the second peer to all remaining peers among peers having a primary path relationship and a candidate path relationship with the first peer, except for peers on the path through which the expulsion notification message for the second peer has already been transmitted.

According to an embodiment of the present disclosure, a method of communication between peers is disclosed. The method according to the embodiment of the present disclosure comprises: transmitting, by the third peer, an expulsion notification message for the second peer to the first peer and the second peer; checking, by the first peer, whether the expulsion notification message for the second peer has been redundantly received from the second peer based on a number of the expulsion notification message for the second peer; when it is determined that the expulsion notification message is a normal message and is not received redundantly, updating, by the first peer, the sequence number of the expulsion notification message to a latest sequence number and storing the latest sequence number; and transmitting, by the first peer, the expulsion notification message for the second peer to all remaining peers among peers having a primary path relationship and a candidate path relationship with the first peer, except for peers on the path through which the expulsion notification message for the second peer has already been transmitted.

The method according to the embodiment of the present disclosure may further comprise selecting, by the first peer, the vertical candidate path between the first peer and the third peer as a new primary path that replaces the primary path between the first peer and the second peer and transmitting a second primary path setting message for setting the primary path between the first peer and the third peer to the third peer.

The method according to the embodiment of the present disclosure may further comprise transmitting, by the third peer, a response message to the second primary path setting message including information about a fourth peer, which is a parent peer of the third peer having a primary path relationship with the third peer, to the first peer.

BRIEF DESCRIPTION OF DRAWINGS

Example embodiments of the present invention will become more apparent by describing in detail example embodiments of the present invention with reference to the accompanying drawings, in which:

FIG. 10 is a conceptual diagram illustrating a format of a header of a HELLO_PEER message between peers in a hybrid P2P network according to an embodiment of the present invention;

FIG. 11 is a conceptual diagram illustrating a format of a header of an ESTAB_PEER message between peers in a hybrid P2P network according to an embodiment of the present invention;

FIG. 12 is a conceptual diagram illustrating a format of a header of a SET_PRIMARY message between peers in a hybrid P2P network according to an embodiment of the present invention;

FIG. 13 is a conceptual diagram illustrating a format of a header of a BROADCAST_DATA message between peers in a hybrid P2P network according to an embodiment of the present invention;

DETAILED DESCRIPTION OF THE EMBODIMENTS

Figure 1:
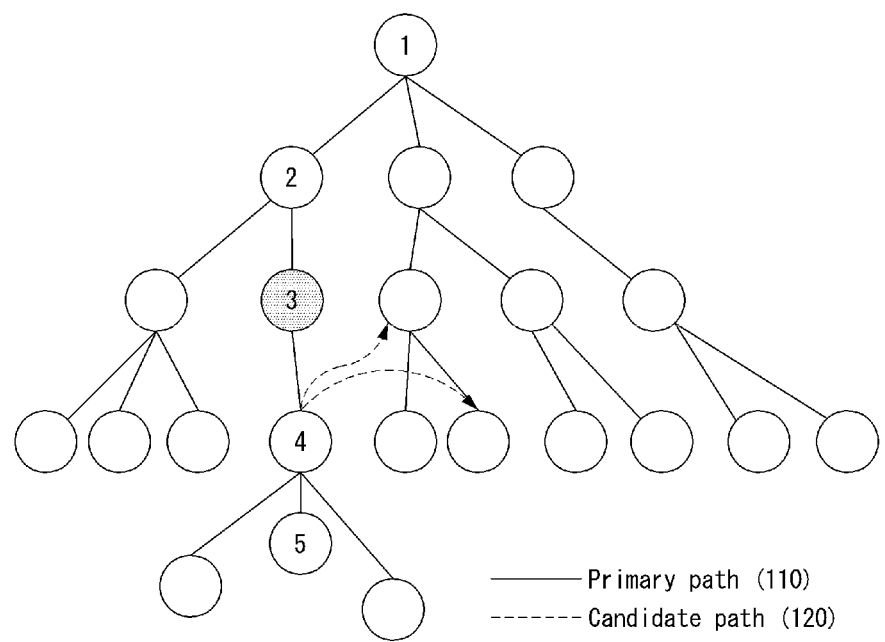
FIG. 1 is a conceptual diagram illustrating primary paths and candidate paths around a peer to be removed in a hybrid P2P network according to an embodiment of the present invention.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Meanwhile, even when the technology is known prior to the filing date of the present application, it may be included as part of the configuration of the present application as necessary, and this will be described herein without obscuring the spirit of the present invention. However, in describing the configuration of the invention of the present application, detailed descriptions of details that can be clearly understood by those skilled in the art as known technologies prior to the filing date of the present application may obscure the purpose of the present invention, and thus excessively detailed description of known technology will be omitted.

For example, in a hybrid overlay peer-to-peer (P2P) network, as a technique and the like in which a peer list is received from a hybrid overlay management server (HOMS), a specific peer is selected from the received peer list to establish a primary connection, and candidate paths are set with one or more other peers, known techniques prior to the application of the present invention, for example, Korean Laid-open Patent Application No. 10-2021-00038281 "Peer and Operation Method of Peer" and the like may be used, and at least some of the known techniques may be applied as elemental techniques necessary for embodying the embodiments of the present invention.

However, the purpose of the present invention is not to claim the rights to these known techniques, and the content of the known techniques may be included as part of the present invention without departing from the spirit and scope of the present invention.

Hereinafter, exemplary embodiments of the present invention will be described in more detail with reference to the accompanying drawings. In order to facilitate overall understanding in the description of the present invention, like reference numerals in the drawings denote like components, and descriptions thereof will not be repeated.

FIG. 1 is a conceptual diagram illustrating primary paths and candidate paths around a peer to be removed in a hybrid P2P network according to an embodiment of the present invention.

A hybrid P2P network defined in International Telecommunication Union Telecommunication Standardization Sector (ITU-T) Q.4100 is composed of a CoreTree for real-time data transmission as a spanning tree composed of peers.

A scheme in which one or a small number of source terminals relay data to a plurality of receiver terminals to transmit the data to all the receiver terminals is used in a tree-based overlay network.

Referring to FIG. 1, candidate paths 120 that can replace a primary path 110 are illustrated assuming that peer 3 leaves the network or is expelled from the network.

In peer 4, information about a primary path 110 between peer 3 and peer 4 is stored. In peer 5, information about a primary path 110 between peer 4 and peer 5 is stored. In peer 2, information about a primary path 110 between peer 2 and peer 1 is stored.

In one embodiment, in peer 4, information about candidate paths 120 through which peer 4 is connected to other peers having the same hierarchy level as peer 3 may be stored.

Figure 2:
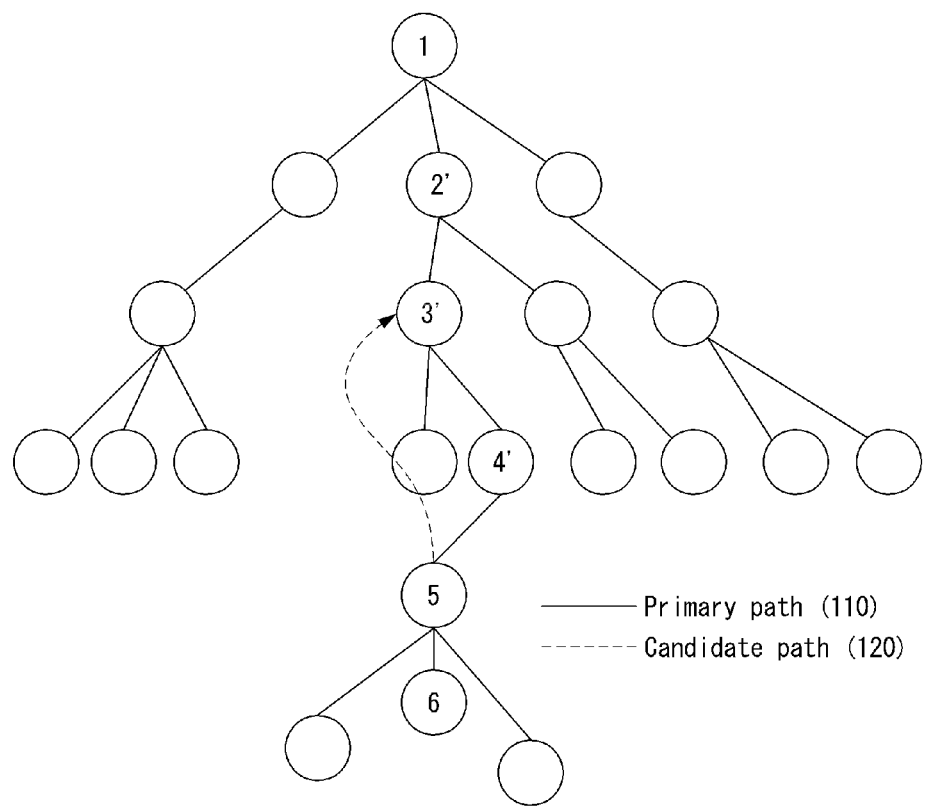
FIG. 2 is a conceptual diagram illustrating a primary path 110 and candidate paths 120 of a network that is reconstructed after a peer in a hybrid P2P network according to an embodiment of the present invention is removed.

FIG. 2 is a conceptual diagram illustrating a primary path 110 and candidate paths 120 of a network that is reconstructed after a peer in a hybrid P2P network according to an embodiment of the present invention is removed.

Referring to FIG. 2, after original peer 3 leaves the network or is expelled from the network, peer 4 is reconstructed as a child peer of peer 3' using the candidate path 120 illustrated in FIG. 1, and thus may have address information as peer 4' in a new network. Peers 5 and 6 are child peers of peer 4' and the same setting as when peers 5 and 6 are child peers of the original peer 4 may be maintained.

In the configuration of FIG. 2, for example, a construction and restoration process for a hybrid overlay network that is specified in ITU-T Q.4101 may be used.

According to the tree construction/restoration procedures defined in ITU-T Q.4100 and Q.4101, a method of rapidly restoring a tree in hybrid P2P is proposed.

To this end, a method in which each peer presets candidate paths 120 with other peers and, when a primary path 110 thereof is disconnected, one of the candidate paths 120 is switched to the primary path 110 may be used.

The primary path 110 serves as a backbone tree for transmitting data.

The candidate path 120 is a path in which a connection is preset for rapid restoration of the network when the primary path 110 fails to function.

When a primary path through which a peer is connected to a parent peer thereof is disconnected, one of other outgoing candidate paths through which the peer is connected to the parent peer may be selected, and a SET_PRIMARY message may be transmitted to the parent peer on the selected outgoing candidate path to switch the selected outgoing candidate path to the primary path.

An incoming candidate path is used when a child peer connected to the peer wants to restore a primary path. All peers may receive a SET_PRIMARY message from child peers via incoming candidate paths.

The HOMS transmits a list of peers having consecutive ticket-ids selected according to criteria determined when providing a list to peers. In this case, the ticket-id is the order in which each peer participates in the network, and when the network is reconstructed after a specific peer leaves the network or is expelled from the network or after a new peer enters the network, whether the primary path of the peer having the largest ticket-id is alive may be checked, and the primary path may be restored using the candidate paths as necessary.

Referring to the embodiments of FIGS. 1 and 2, when the primary path has lost its function, it is possible to restore the network using the candidate paths, and it is possible to prevent each peer from being unintentionally excluded from the network and service.

However, in the process of restoring the tree, changes in network connection may be large, and when a hierarchy level of the shape of the tree increases, there may be concern about the path through which data is transmitted to an end peer becoming longer and performance of the service being degraded.

Figure 3:
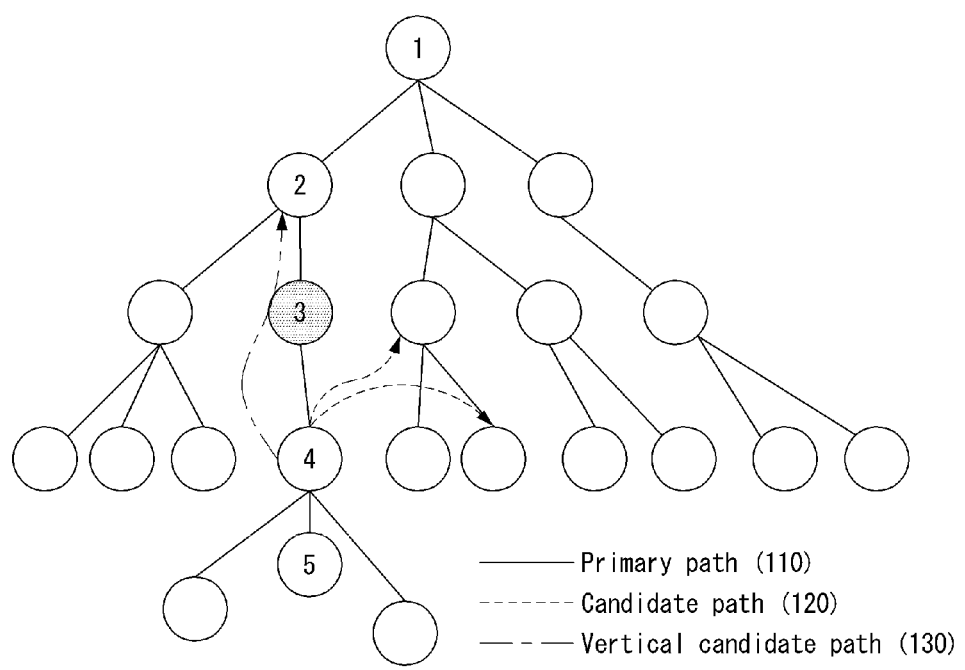
FIG. 3 is a conceptual diagram illustrating a primary path, candidate paths, and a vertical candidate path around a peer to be removed in a hybrid P2P network according to an embodiment of the present invention.

FIG. 3 is a conceptual diagram illustrating a primary path, candidate paths, and a vertical candidate path around a peer to be removed in a hybrid P2P network according to an embodiment of the present invention.

Figure 4:
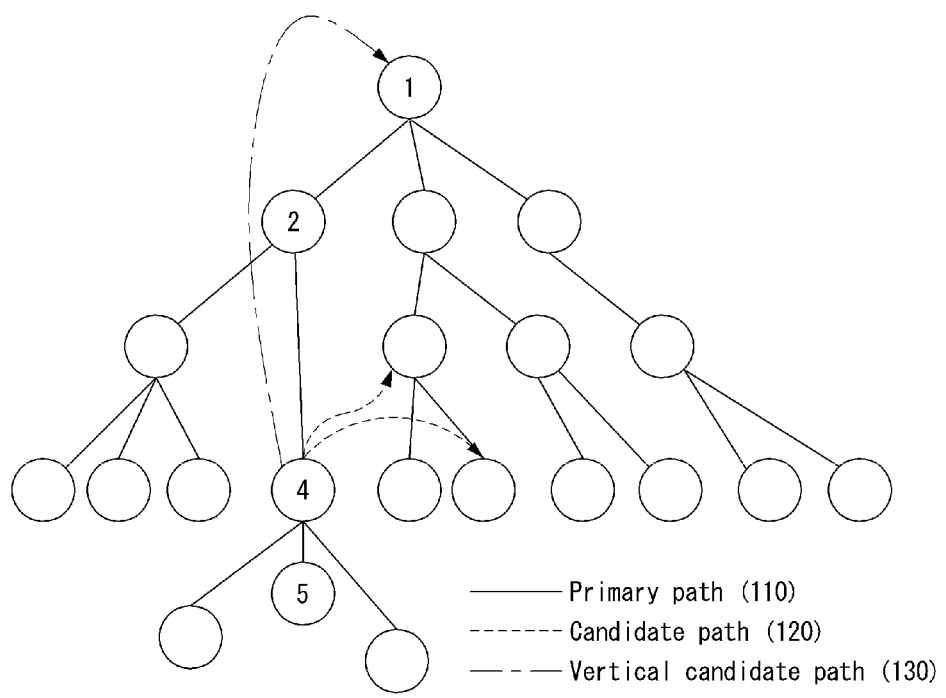
FIG. 4 is a conceptual diagram illustrating a primary path, candidate paths, and a vertical candidate path of a network that is reconstructed after a peer in a hybrid P2P network according to an embodiment of the present invention is removed.

FIG. 4 is a conceptual diagram illustrating a primary path, candidate paths, and a vertical candidate path of a network that is reconstructed after a peer in a hybrid P2P network according to an embodiment of the present invention is removed.

Referring to FIGS. 3 and 4, a path setting method within a network, in which a specific peer located in the middle of a hybrid overlay network can be safely removed, is illustrated. Using the embodiments of FIGS. 3 and 4, a path setting method within a network, in which a disconnected path can be restored while maintaining an existing hierarchy structure to prevent an increase in data transmission path to an end peer, is illustrated.

In FIG. 3, in peer 5, a path between peers 4 and 5 may be stored as an outgoing primary path 110. In peer 4, a path between peers 3 and 4 may be stored as an outgoing primary path 110 and a path through which peer 4 is connected to another parent peer having the same hierarchy level as peer 3 may be stored as a candidate path 120. In addition, in peer 4, a path through which peer 4 is connected to peer 2, which is a parent peer of peer 3 on the outgoing primary path 110, may be stored as a vertical candidate path 130.

FIG. 4 illustrates a process of restoring and reconfiguration the network after peer 3 of FIG. 3 is removed from the network.

Peer 4 may set a path between peers 2 and 4 as a new primary path 110 using the vertical candidate path 130 of FIG. 3. In this case, in peer 4, the existing candidate paths 120 may be maintained without change.

Peer 4 may set a new vertical candidate path 130 connected to peer 1, which is a parent peer of peer 2 on the new primary path 110, and update related information.

Comparing FIGS. 3 and 4, the path through which peer 4 receives data from peer 1 does not become longer. As a result, a path through which peer 4 and peers on the path at a lower level thereof receive data and a path through which the service is received do not become longer, and performance of the service may not be degraded.

For convenience of description, in FIGS. 3 and 4, only information about the vertical candidate path 130 of peer 4 is illustrated, but most peers in the network may set a vertical candidate path 130 corresponding to the primary path 110 and related information may be stored therein. Only the highest and second highest peers of the hierarchy cannot set the vertical candidate path 130, but most peers may set the vertical candidate path 130 and related information may be stored therein.

Figure 5:
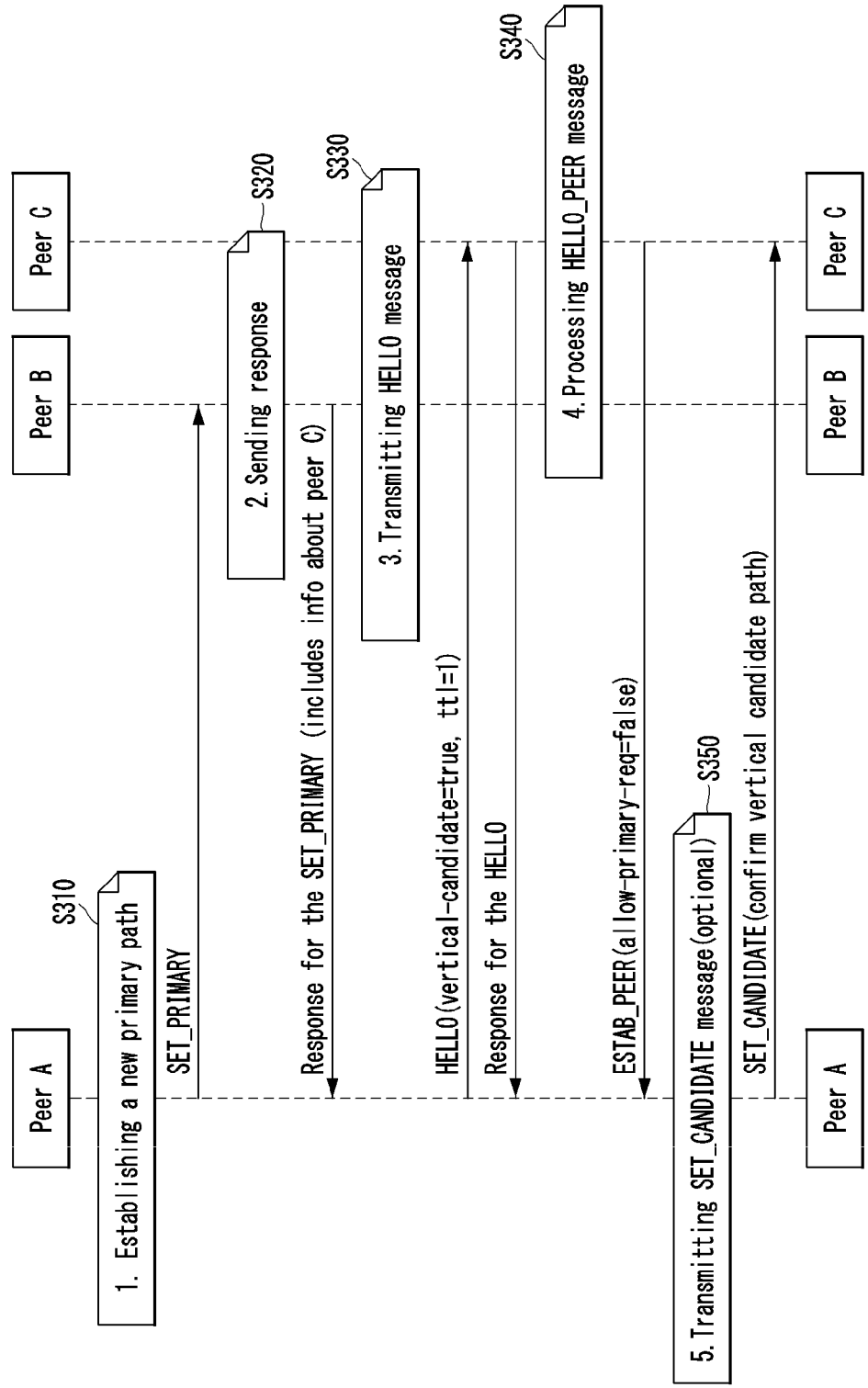
FIG. 5 is a conceptual diagram illustrating a process of setting a vertical candidate path when a primary path is set in a hybrid P2P network and a protocol according to an embodiment of the present invention.

FIG. 5 is a conceptual diagram illustrating a process of setting a vertical candidate path when a primary path is set in a hybrid P2P network and a protocol according to an embodiment of the present invention.

Figure 6:
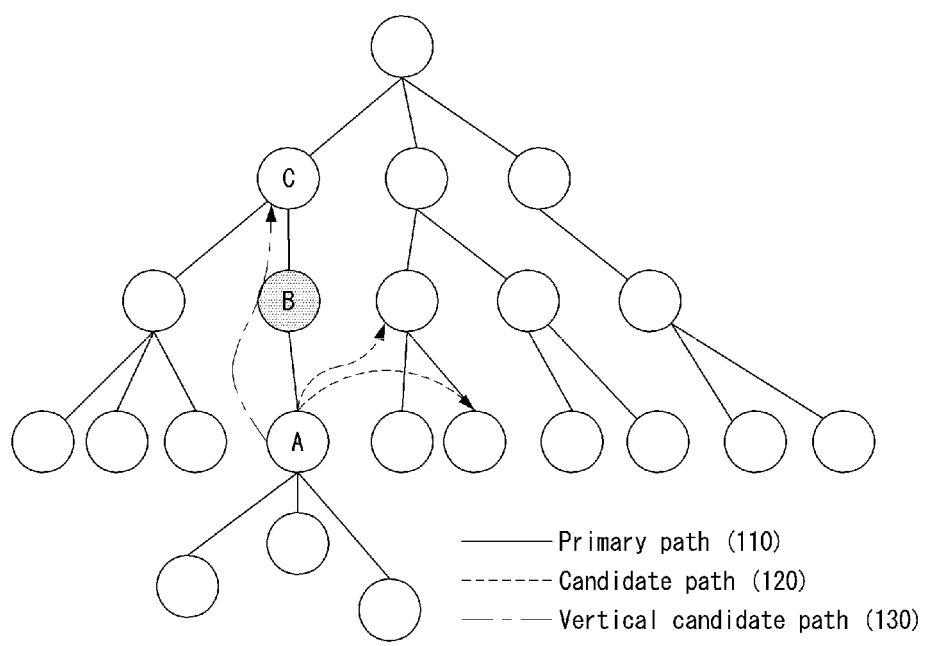
FIG. 6 is a conceptual diagram illustrating a hybrid P2P network according to an embodiment of the present invention for describing the protocol of FIG. 5.

FIG. 6 is a conceptual diagram illustrating a hybrid P2P network according to an embodiment of the present invention for describing the protocol of FIG. 5.

Referring to FIGS. 5 and 6, a path setting method performed in a peer included in the hybrid P2P network according to the embodiment of the present invention is illustrated.

The path setting method performed in the peer within the hybrid P2P network according to the embodiment of the present invention may be implemented by executing, by a processor that executes at least one instruction stored in a memory, the at least one instruction.

For convenience of description, in the embodiment of FIG. 5, it is assumed that peer A is a first peer, peer B is a second peer, and peer C is a third peer, and that a parent peer of the first peer is the second peer and a parent peer of the second peer is the third peer. The third peer may have a lower ticket-id value than the second peer, and the second peer may have a lower ticket-id value than the first peer. That is, a peer having a lower ticket-id may correspond to the highest hierarchy in the network.

A method of setting a path between peers in a hybrid P2P network according to an embodiment of the present invention includes an operation S310 of transmitting, by a first peer, a primary path setting message SET_PRIMARY for setting a primary path between the first peer and a second peer to the second peer, an operation S320 of transmitting, by the second peer, a response message to the primary path setting message SET_PRIMARY including information about a third peer, which is a parent peer of the second peer having a primary path relationship with the second peer, to the first peer, and operations S330, S340, and S350 of transmitting one or more messages (e.g., HELLO, ESTAB_PEER, and SET_CANDIDATE) for setting a vertical candidate path with the third peer between the first peer and the third peer using the information about the third peer.

The operations of transmitting the one or more messages between the first peer and the third peer may include an operation S330 of transmitting, by the first peer, a first message HELLO including a vertical candidate path parameter for the third peer to the third peer, and an operation S340 of transmitting, by the third peer, a second message (e.g., in response to HELLO and/or ESTAB_PEER) to the first peer in response to the first message.

The operation of transmitting the one or more messages between the first peer and the third peer may further include an operation S350 of transmitting a vertical candidate path setting message SET_CANDIDATE for setting the vertical candidate path with the third peer to the third peer when the first peer receives the second message. The vertical candidate path setting message SET_CANDIDATE in operation S350 is an optional operation, and when a first message HELLO and a second message ESTAB_PEER are mutually transmitted and received between the first peer and the third peer, the vertical candidate path setting message SET_CANDIDATE may be omitted in an embodiment in which the vertical candidate path between the first peer and the third peer is considered to be set.

In the second message ESTAB_PEER, a value of a field "allow-primary-req" related to the primary path may be set to a value corresponding to "negative" (e.g., "false") to prevent a loop between the first peer, the second peer, and the third peer from being formed. That is, a path between the third peer and the first peer is not the primary path and may be defined as one of the candidate paths. In this case, a value of a field "ttl" of the second message ESTAB_PEER is set to "1" so that only the first peer, which is a receiver, is designated as one receiver and transmitted, and may not be transmitted to other peers.

The method of setting a path between the peers in the hybrid P2P network according to the embodiment of the present invention may further include an operation of setting the vertical candidate path between the first peer and the third peer as a first-priority candidate of a new primary path for replacing the primary path between the first peer and the second peer in a case in which the second peer leaves the network or is expelled from the network.

The method of setting a path between the peers in the hybrid P2P network according to the embodiment of the present invention may further include an operation of terminating any one of a plurality of preset candidate paths to set the vertical candidate path between the first peer and the third peer when the first peer receives the second message ESTAB_PEER and candidate paths in a candidate path pool of the first peer are all occupied.

In this case, one, which is terminated, of the plurality of candidate paths may be one of the outgoing candidate paths with the peer having the highest ticket-id. Such a configuration may be specified by a protocol that is intended so that a hierarchy of the network reset by the candidate path does not have an excessively large depth.

The method of setting a path between the peers in the hybrid P2P network according to the embodiment of the present invention may further include an operation of sharing, by the second peer, the primary path setting message SET_PRIMARY between the first peer and the second peer, which is transmitted from the first peer, with one or more peers having the primary path relationship with the second peer.

In operation S310 of transmitting the primary path setting message SET_PRIMARY to the second peer, the second peer from among one or more peers having candidate paths with the first peer may be determined as a counterpart peer on the primary path, and the primary path setting message SET_PRIMARY may be transmitted to the second peer.

A path setting method performed in a first peer included in a hybrid P2P network according to an embodiment of the present invention includes an operation S310 of transmitting, by the first peer, a primary path setting message SET_PRIMARY for setting a primary path between the first peer and a second peer to the second peer, an operation S320 of receiving, by the first peer, a response message to the primary path setting message SET_PRIMARY from the second peer, and operations S330, S340, and S350 of transmitting, by the first peer, one or more messages (e.g., HELLO, ESTAB_PEER, and SET_CANDIDATE) for setting a vertical candidate path for a third peer to the third peer using information about the third peer, which is included in the response message and is a parent peer of the second peer having a primary path relationship with the second peer.

The operation of transmitting the one or more messages to the third peer may include an operation S330 of transmitting a first message HELLO including a vertical candidate path parameter with the third peer to the third peer, and an operation S340 of receiving a second message ESTAB_PEER from the third peer in response to the first message.

The operation of transmitting the one or more messages to the third peer may further include an operation S350 of transmitting a vertical candidate path setting message SET_CANDIDATE for setting the vertical candidate path with the third peer to the third peer when the first peer receives the second message.

The path setting method performed in the first peer included in the hybrid P2P network according to the embodiment of the present invention may further include an operation of terminating any one of a plurality of preset candidate paths to set the vertical candidate path between the first peer and the third peer when the first peer receives the second message and candidate paths in a candidate path pool of the first peer are all occupied.

When the primary path setting message SET_PRIMARY is received, the primary path may be set between the first peer and the second peer, and the second peer may transmit the response message including the information about the third peer that is a parent peer of the second peer (S320). In this case, the response message may include a peer-id, an instance-id, a network address, and the like for the third peer. When the second peer does not have the third peer that is a parent peer thereof, operation S320 may not be performed and the vertical candidate path may not be set.

In operation S330, the first message HELLO may include a parameter "vertical-candidate." In this case, the vertical-candidate parameter may be designated as a value indicating affirmation, for example "true." The first message HELLO is specified as ttl=1 and may not be shared with other peers.

When the third peer cannot accept a vertical candidate path request of the first peer, the third peer may ignore the first message HELLO. In this case, when the first peer cannot receive a response message to the first message HELLO from the third peer, the process of setting the vertical candidate path between the first peer and the third peer may be abandoned.

Figure 7:
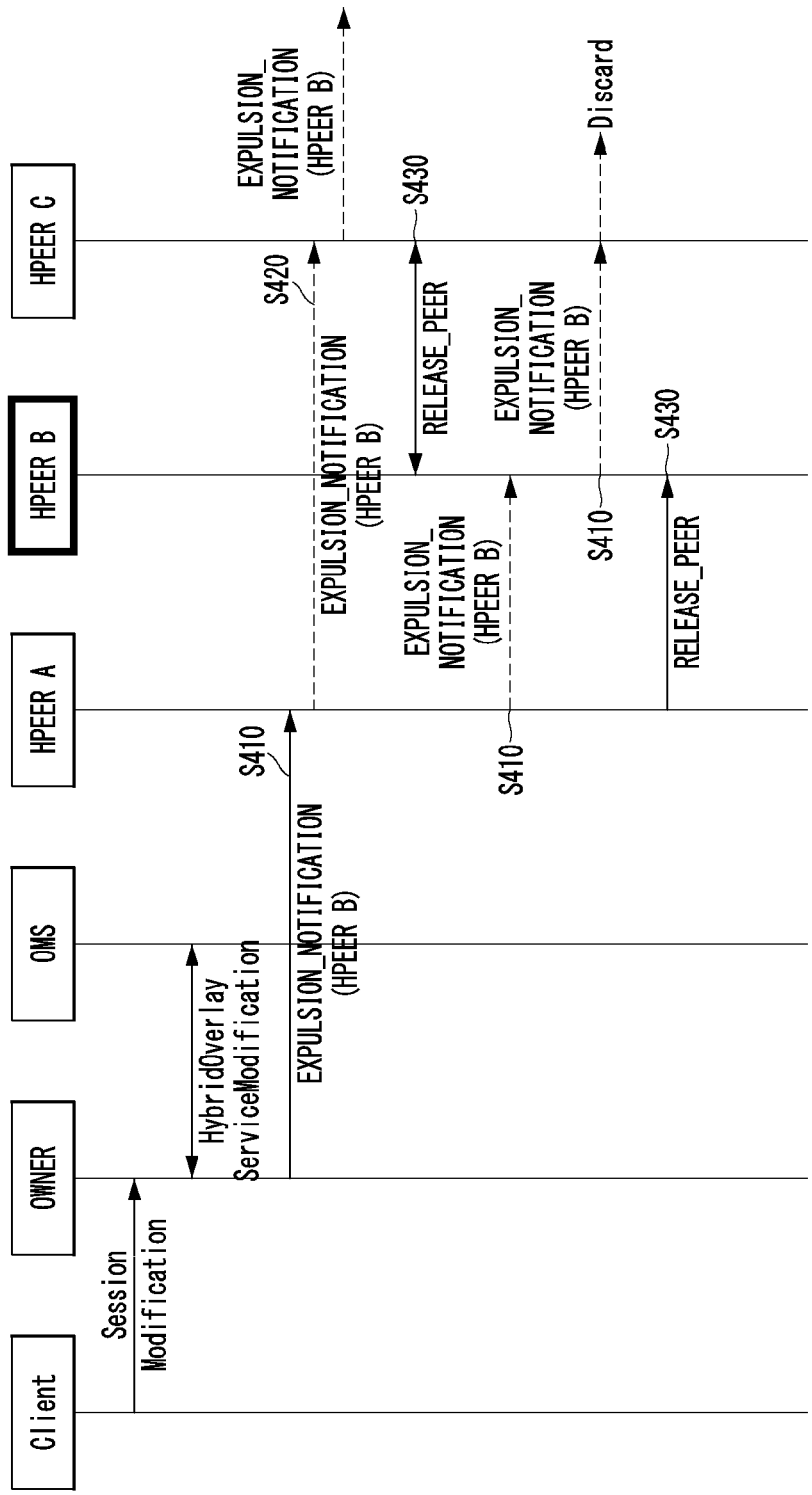
FIG. 7 is a conceptual diagram illustrating a process of expelling a peer in a hybrid P2P network and a protocol according to an embodiment of the present invention.

FIG. 7 is a conceptual diagram illustrating a process of expelling a peer in a hybrid P2P network and a protocol according to an embodiment of the present invention.

Referring to FIG. 7, it is assumed that HPEER B, a target of expulsion, is a second peer, HPEER A, a parent peer of the second peer, is a third peer, and HPEER C, a child peer of the second peer, is a first peer.

When a peer of a general user is located on an intermediate path of all messages (data, control) and does not maliciously propagate data to other peers, there is a high possibility of problems with the entire service.

It is possible to prevent data tampering by adding and transmitting a signature with a public key of a transmitting peer, but a method of removing malignant peers that do not transmit messages is required. To this end, the configuration of the example embodiment of the present invention is proposed.

First, an owner peer may transmit a request for removing a specific peer B to a HOMS or an OMS.

The owner peer may transmit an expulsion notification message EXPULSION_NOTIFICATION for requesting termination of connection with HPEER B to all peers that are connected to the owner peer through a primary path and candidate paths (S410).

The expulsion notification message EXPULSION_NOTIFICATION may include the following items (e.g., a control command, command code indicating peer exclusion, an object to be excluded, an identifier of peer to be excluded, and a message signature).

The expulsion notification message EXPULSION_NOTIFICATION is signed with a private key of the owner peer so that the receiving peer can check that such information has not been tampered with. It is assumed that the public key of the owner peer is obtained from the HOMS or obtained using a third method.

HPEER A may transmit the expulsion notification message EXPULSION_NOTIFICATION for HPEER B to not only HPEER B but also HPEER C for which a vertical candidate path is set with HPEER A serving as a child peer of HPEER B (S420).

All nodes (e.g., HPEER A and HPEER C) connected to HPEER B may receive the expulsion notification message EXPULSION_NOTIFICATION and then release the connection with HPEER B (S430). The connection release process may be performed by exchanging a RELEASE_PEER message.

Figure 8:
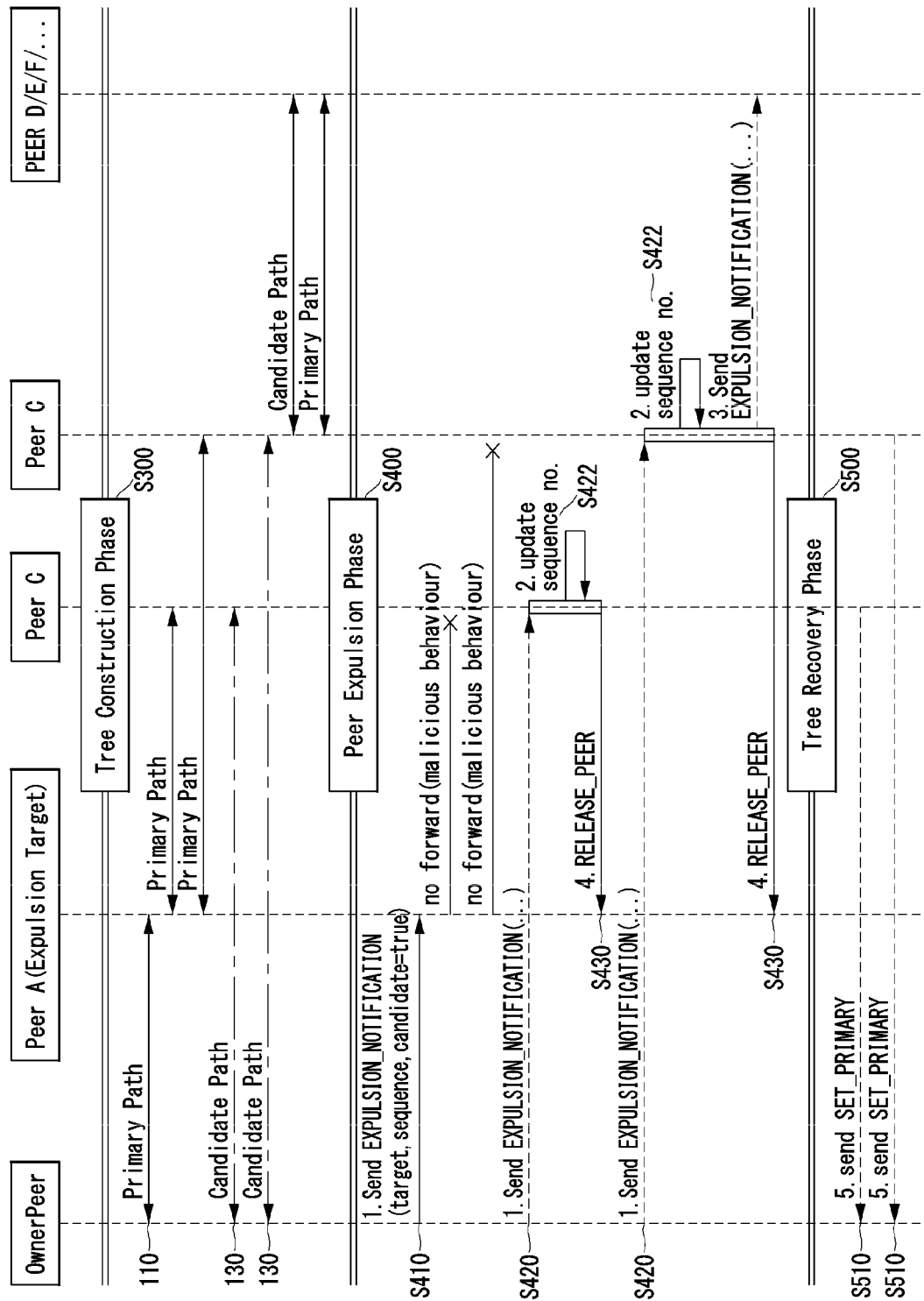
FIG. 8 is a conceptual diagram illustrating a process of expelling a peer in a hybrid P2P network according to an embodiment of the present invention, a process of restoring the network after peer expulsion, and a protocol.

FIG. 8 is a conceptual diagram illustrating a process of expelling a peer in a hybrid P2P network according to an embodiment of the present invention, a process of restoring the network after peer expulsion, and a protocol.

Figure 9:
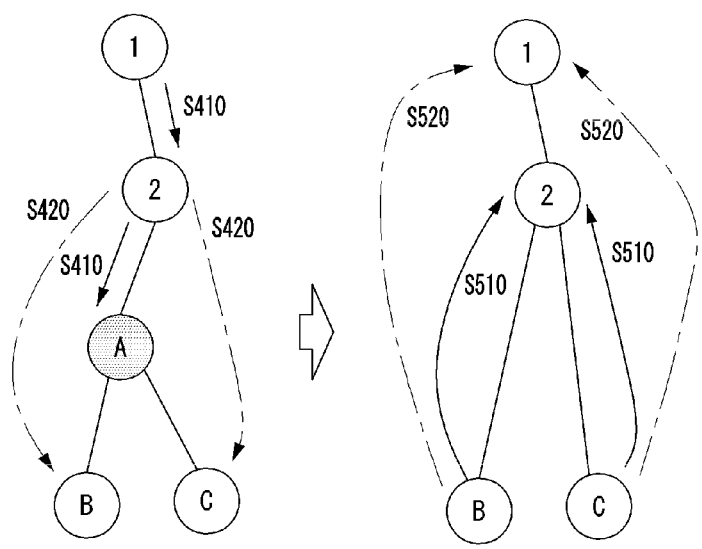
FIG. 9 is a conceptual diagram illustrating a hybrid P2P network according to an embodiment of the present invention for describing the process and protocol of FIG. 8.

FIG. 9 is a conceptual diagram illustrating a hybrid P2P network according to an embodiment of the present invention for describing the process and protocol of FIG. 8.

Referring to FIGS. 8 and 9, it is assumed that Peer A, a target of expulsion, is a second peer, OwnerPeer, a parent peer of the second peer, is a third peer, and Peers B and C, child peers of the second peer, are first peers.

The method of setting a path between the peers in the hybrid P2P network according to the embodiment of the present invention may further include an operation S420 of transmitting, by the third peer, the expulsion notification message EXPULSION_NOTIFICATION for the second peer received from OwnerPeer (S410) to the first peer and the second peer, an operation S422 of checking, by the first peer, whether the expulsion notification message EXPULSION_NOTIFICATION for the second peer has been redundantly received from the second peer, and an operation of transmitting, by the first peer, the expulsion notification message EXPULSION_NOTIFICATION for the second peer to all remaining peers among peers having a primary path relationship and a candidate path relationship with the first peer, except for peers on the path through which the expulsion notification message EXPULSION_NOTIFICATION for the second peer has already been transmitted.

Further, all nodes (e.g., Peers B and C) connected to Peer A may receive the expulsion notification message EXPULSION_NOTIFICATION and then release the connection with Peer A (S430).

The method of setting a path between the peers in the hybrid P2P network according to the embodiment of the present invention may further include an operation S420 of receiving, by the first peer, the expulsion notification message EXPULSION_NOTIFICATION for the second peer from the third peer, an operation S422 of checking, by the first peer, whether the expulsion notification message EXPULSION_NOTIFICATION for the second peer has been redundantly received from the second peer, and an operation of transmitting, by the first peer, the expulsion notification message EXPULSION_NOTIFICATION for the second peer to all remaining peers among peers having a primary path relationship and a candidate path relationship with the first peer, except for peers on the path through which the expulsion notification message EXPULSION_NOTIFICATION for the second peer has already been transmitted.

The method of setting a path between the peers in the hybrid P2P network according to the embodiment of the present invention may further include an operation S510 of selecting, by the first peer (Peer B or C), the vertical candidate path between the first peer and the third peer (Peer 2) as a new primary path that replaces the primary path between the first peer and the second peer (Peer A) and transmitting a second primary path setting message for setting the primary path between the first peer and the third peer to the third peer.

The method of setting a path between the peers in the hybrid P2P network according to the embodiment of the present invention may further include an operation of transmitting, by the third peer, a response message to the second primary path setting message including information about a fourth peer (Peer 1), which is a parent peer of the third peer having a primary path relationship with the third peer, to the first peer.

Thereafter, the method of setting a path between the peers in the hybrid P2P network according to the embodiment of the present invention may further include an operation S520 of transmitting, by the first peer, a second vertical candidate path setting message to the fourth peer (Peer 1) using information about the fourth peer included in the response message to the second primary path setting message.

Since the malignant peers of FIGS. 7 to 9 have a possibility of not propagating the control message to the peers connected thereto, the embodiments of FIGS. 7 to 9 are alternatively presented as countermeasures against such possibility.

Referring to the tree construction phase S300 of FIG. 8, each peer may be set to utilize the paths other than the primary path 110 for transmission of the control message.

A control message for excluding peers may be controlled to be propagated to all the primary path and the candidate paths 120 and 130. All the peers may be set to secure enough candidate paths 120 and 130.

To this end, when the number of peers participating in an overlay network is three or more, one primary path 110 and one or more candidate paths 120 and 130 may be set.

In particular, Peers B and C, which are child peers of Peer A of FIG. 8, may set and hold the vertical candidate path 130 with OwnerPeer, which is a parent peer of Peer A.

In the embodiment of the present invention, even when a specific peer is excluded, the shape of the tree should not be greatly changed, and the embodiment of the present invention may be implemented by a protocol intended to be micro surgery.

In the embodiment of FIG. 2, when a peer list is provided, the peer list may be provided only in the order of ticket-id. In this case, the shape of the tree may be changed greatly when the tree is restored. In such a restoration process, it is possible to increase transmission efficiency and complexity and increase the possibility of on-the-fly message loss during the restoration process.

Meanwhile, in the case of the related art in the related art document in which control and data messages are transmitted only through a primary path, there is a possibility that a malignant peer does not transmit its expulsion message to other peers, as illustrated in the peer expulsion phase S400 of FIG. 8. In order to prepare for such a case, in the present invention, the message may be transmitted to all the candidate paths and the primary path so that data may be transmitted to other peers that are connected to the malignant peer through the primary path or the candidate paths.

Meanwhile, all the messages transmitted by the owner peer include sequence numbers. Each time the control message is transmitted, the sequence number may be incremented by 1. Further, in order to prevent message tampering, a value obtained by signing a hash value of a header of a message with a private key of the owner peer is loaded on a payload and transmitted.

A peer that receives the message immediately propagates the message through all primary and candidate paths connected thereto. However, when the message has already been received, the message does not propagate any more. Redundant reception is determined based on the sequence number, and the latest sequence number is stored and maintained in an internal memory of the peer. When the message is determined as a normal message and is not redundant, the sequence number stored in the internal memory is updated. This is a way to prevent a message storm.

In order to verify that the message is a message transmitted by the owner peer, the signature is verified with the public key of the owner peer. When this process fails, the corresponding message is discarded and the process is terminated. A separate error response is not required.

Since the message can be received via all the primary path and the candidate paths, the same message may arrive redundantly.

In order to check that the messages are the same, the peer always remembers the last sequence number of the control message received from the owner peer.

When the peer and a peer to be removed are connected through the primary path, the connection with the peer to be removed is terminated, and one of the outgoing candidate paths is selected and switched to the primary path. To this end, a SET_PRIMARY message is transmitted.

When the peer and the peer to be removed are connected through the candidate path, the peer may terminate the connection with the corresponding peer. In order to secure an additional candidate path, a HELLO_PEER message may be broadcasted.

In the restoration phase S500 of FIG. 8, an operation S510 of establishing a primary path for other peers is illustrated in order to minimize tree changes in excluding specific damage and to secure a vertical candidate path for rapid restoration.

FIG. 10 is a conceptual diagram illustrating a format of a header of a HELLO_PEER message between peers in a hybrid P2P network according to an embodiment of the present invention.

A peer that receives a HELLO_PEER message may forward the HELLO_PEER message to peers connected thereto through a primary path, but when the HELLO_PEER message includes a vertical-candidate parameter, the peer may forward the HELLO_PEER message (including the vertical-candidate parameter) only to parent peers of the peer.

Referring to FIG. 10, the vertical-candidate parameter is a Boolean type and may be used as a request for generating a vertical candidate path.

FIG. 11 is a conceptual diagram illustrating a format of a header of an ESTAB_PEER message between peers in a hybrid P2P network according to an embodiment of the present invention.

A parent peer may transmit an ESTAB_PEER message in response to a HELLO_PEER message of a child peer.

When the parent peer receives the HELLO_PEER message, whether there is free space in the network connection capacity of the parent peer may be checked. When the parent peer can set a path in response to the HELLO_PEER message, the ESTAB_PEER message may be transmitted to the child peer.

In this case, the ESTAB_PEER message may be regarded as a path setting request message transmitted from the parent peer to the child peer. When the child peer receives the ESTAB_PEER message, a message transmission/reception process for path setting may be performed.

In this case, when the vertical-candidate parameter is included in the HELLO_PEER message, an allow-primary-req parameter of the ESTAB_PEER message may be set to "false" to clarify that the ESTAB_PEER message does not request or allow the primary path.

FIG. 12 is a conceptual diagram illustrating a format of a header of a SET_PRIMARY message between peers in a hybrid P2P network according to an embodiment of the present invention.

When a peer receives a SET_PRIMARY message, responses thereto may be divided into two types of responses.

When a primary path can be set, the peer may perform internal processing for primary path setting and then return a 200 response in response to the SET_PRIMARY message.

In this case, the 200 response may include a PEER_BUFFERMAP message indicating a status of a caching buffer. The buffer map of the peer that transmits the SET_PRIMARY message may be compared to the buffer map of the peer that responds thereto, and when there is data that the responding peer did not hold among the data of the transmitting peer, the responding peer may request the data from the transmitting peer.

A response message may include information about a parent peer of the responding peer. Items included in the response message may include, for example, a peer-id, a network address for establishing a vertical candidate path, and the like. When there is no parent peer of the responding peer, the response message may not include the related parameter.

When the primary connection is not possible due to an internal problem or the like, the peer may transmit a 603 response in response to the SET_PRIMARY message.

FIG. 13 is a conceptual diagram illustrating a format of a header of a BROADCAST_DATA message between peers in a hybrid P2P network according to an embodiment of the present invention.

BROADCAST_DATA request and response messages may be exchanged between peers to transmit data. A BROADCAST_DATA message may be used by a peer to broadcast its own primary relationship to other peers.

An owner peer may transmit a BROADCAST_DATA request message via candidate paths. The BROADCAST_DATA request message may be used to spread the transmission of a control message. Both binary information and text may be used as data. The peers that receive the BROADCAST_DATA request message may forward the BROADCAST_DATA request message to other peers connected thereto through the primary path.

Figure 14:
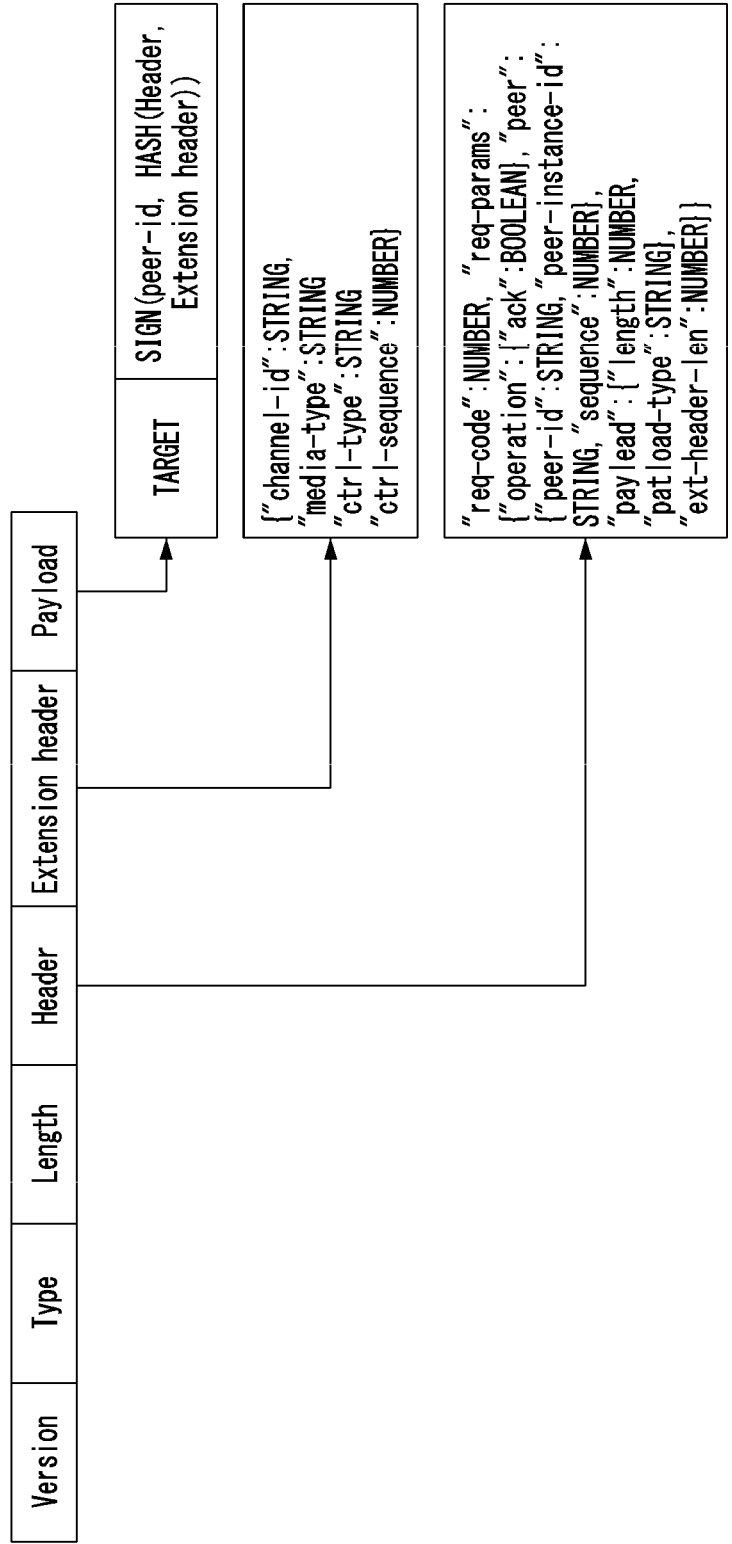
FIG. 14 is a conceptual diagram illustrating a format of an EXPULSION_NOTIFICATION message between peers in a hybrid P2P network according to an embodiment of the present invention.

FIG. 14 is a conceptual diagram illustrating a format of an EXPULSION_NOTIFICATION message between peers in a hybrid P2P network according to an embodiment of the present invention.

Referring to FIG. 14, a concept defined in the ITU-T Q.4102 standard may be used as a header field. In this case, a field "req-code" may be set to "6" and a field "payload-type" may be set to "application/octet-stream."

An extension header may be a field including information related to peer expulsion.

In this case, a field "ctrl-sequence" is a parameter having a value that increases whenever a control message is received from the owner peer. This parameter may prevent a message storm and provide a way to efficiently broadcast a message.

Information about whether a path through which an EXPULSION NOTIFICATION message is transmitted is a candidate path or a primary path may be included in an additional field.

Figure 15:
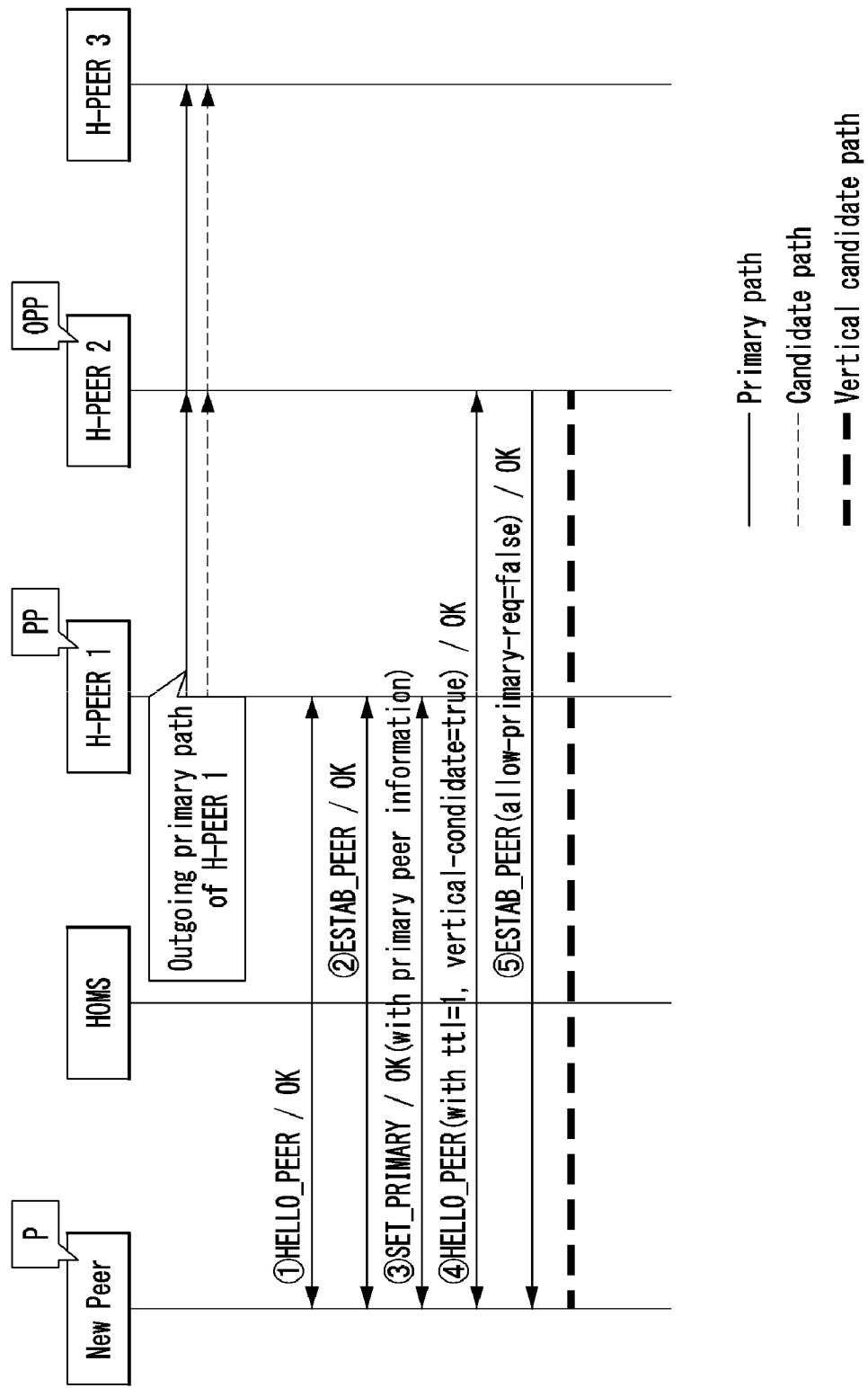
FIG. 15 is a conceptual diagram illustrating a process of setting a vertical candidate path after setting a primary path of a peer in a hybrid P2P network and a protocol according to an embodiment of the present invention.

FIG. 15 is a conceptual diagram illustrating a process of setting a vertical candidate path after setting a primary path of a peer in a hybrid P2P network and a protocol according to an embodiment of the present invention.

In the restoration phase S500 of FIG. 8, the operation S510 of establishing the primary path for other peers is illustrated in order to minimize tree changes in excluding specific damage and to secure a vertical candidate path for rapid restoration.

In the restoration phase S500, the following processes are performed after a tree structure is newly constructed.

The process of securing the vertical candidate path is performed in the following cases.

A case in which a SET_PRIMARY message is transmitted while an initial primary path is constructed and a case in which an existing primary path is disconnected and one of the existing candidate paths is switched to the primary path so that the SET_PRIMARY message is transmitted may be included.

[P→PP] A peer (hereinafter, referred to as "P") may transmit a SET_PRIMARY request message to set a primary path for a parent peer (hereinafter, referred to as "PP").

[PP→P] A PP that receives the SET_PRIMARY request message may transmit information about a peer (hereinafter, referred to as "OPP") connected through its own outgoing primary path as a response message.

[PP] The information includes a peer ID, an instance ID, a network address, and the like necessary for accessing the corresponding OPP.

[PP] When there is no OPP (i.e., in the case of a peer having the lowest ticket-id among peers participating in an overlay network at that time point), the corresponding information may not be included.

[P] In this case, the P may stop trying to secure an additional candidate path. This is because the number of peers participating in the P2P network is small. It may be meaningless to try to establish more candidate paths in such a situation.

[P→OPP] The P may transmit a HELLO_PEER message to the OPP that has a primary path for its own PP.

In this case, a value of a TTL parameter of the HELLO_PEER message is set as 1 so that the HELLO_PEER message is no longer propagated. That is, there is an effect of transmitting only to that corresponding peer.

A special parameter "vertical-candidate" (=true) may be added to distinguish the HELLO_PEER message from a general HELLO_PEER message.

[OPP] The OPP may check whether there is a room in its own candidate path pool.

In order to prevent the P from transmitting the SET_PRIMARY message in response to the HELLO_PEER message, a special parameter "allow-primary-req" (=false) may be added and transmitted.

[P→OPP] When the P receives a message that includes the parameter "allow-primary-req" (=false), the P does not transmit the SET_PRIMARY message. When the candidate path pool of the P is already full, a new path established with the OPP is preserved, and the connection with a peer having the highest ticket-id among the existing outgoing candidate paths is terminated.

That is, there may be a case in which the P has already secured several candidate paths at a time point, at which the P initially joins, and has as many candidate paths as a maximum value of the candidate connection pool. In this case, the path for the OPP is prioritized and the connection with one candidate path in the existing pool may be terminated.

[OPP→P] As a result of the check, when the OPP side cannot afford to allow the candidate path, an error message may be transmitted in response to the HELLO_PEER message.

All peers in the tree-structured network serve to forward packets the peers receive to other peers, but there is a risk that a peer with malicious intent may not forward the packets to other peers or falsify and transmit the packets to other peers.

In the hybrid overlay network of the related art, a function for removing a specific peer cannot be provided, and even when it is intended to remove the specific peer through a separate control message, there is a risk that the tree itself may be divided into two or more separate segments when a malignant peer does not transmit messages to child peers thereof.

Even when an owner peer located at the top transmits a specific peer expulsion message, when the malicious peer does not transmit the specific peer expulsion message to child peers thereof, there may be a problem that the tree of the sub-hierarchy under the malicious peer is disconnected.

According to the embodiments of FIGS. 1 to 15, a method of safely removing the specific peer in the middle of the tree-based overlay network is provided.

According to the embodiments of FIGS. 1 to 15, since the messages are broadcast simultaneously on the primary path and the candidate paths, the peers located under the malicious peer may also check the expulsion message.

Further, since the candidate paths with peers on grandparents or OPPs are pre-secured, it is possible to connect to the peer directly above the expelled peer without significant changes in the tree during restoration.

Even when a normal peer in addition to the malignant peer is disconnected, the tree is restored while maintaining the existing tree structure (hierarchy), and thus it is possible to prevent an increase in data transmission paths and improve the transmission performance level.

It is possible to prevent the depth of the tree from being deepened by securing the vertical candidate path, and thus it is possible to shorten the data transmission path.

According to the embodiments of FIGS. 1 to 15, a tree shape change minimization method is disclosed in which stability of the tree can be increased and performance degradation of a restored tree can be prevented.

As soon as a newly participating peer establishes a primary path for the existing peer, a SCANTREE message may be transmitted, and a HELLO message with TTL=1 may be transmitted to primary peers connected to the existing peer to set a (vertical) candidate path for secondary parent peers.

When the connection with the existing peer is disconnected, the candidate path for the secondary parent peers may be selected first, and the network setting/configuration may be restored by replacing the primary path.

In the embodiments of the present invention, a process of restoring the tree when the specific peer disappears is described. The key to the restoration process is to promote one of the candidate paths to the primary path while avoiding the generation of a loop in the global tree using only local information around the peer in the tree.

In the tree restoration process, when one of several candidate paths is selected based on a random criterion or network performance alone, the shape of the tree may be changed significantly. When such a change is large, the loss of data as well as the cost required for the restoration process may increase and the network may become unstable.

Even when the peer located in the middle of the tree leaves or is expelled, it is desirable to perform micro surgery so that the shape of the tree is not changed significantly.

Figure 16:
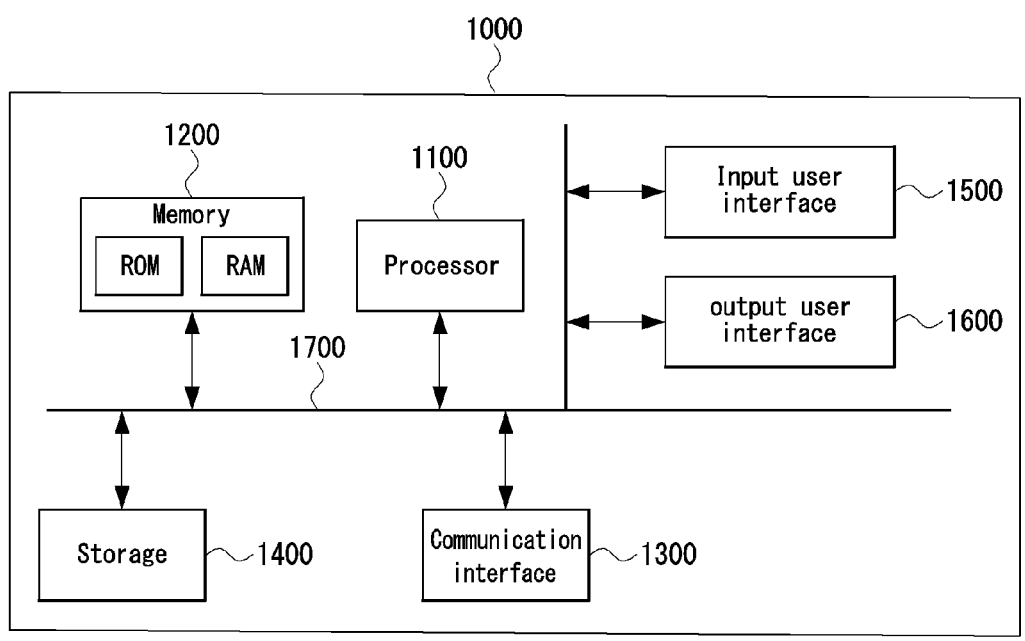
FIG. 16 is a conceptual diagram illustrating an example of a peer in a generalized hybrid P2P network that can perform at least part of the processes of FIG. 1 to 15 or an example of a computing system constituting the peer.

FIG. 16 is a conceptual diagram illustrating an example of a peer in a generalized hybrid P2P network that can perform at least part of the processes of FIG. 1 to 15 or an example of a computing system constituting the peer.

At least a part of the method of setting a path between the peers in the hybrid P2P network according to the embodiment of the present invention may be performed by a computing system 1000 of FIG. 16.

Referring to FIG. 16, the computing system 1000 according to the embodiment of the present invention may include a processor 1100, a memory 1200, a communication interface 1300, a storage device 1400, an input interface 1500, an output interface 1600, and a bus 1700.

The computing system 1000 according to the embodiment of the present invention may include at least one processor 1100 and a memory 1200 for storing instructions instructing the at least one processor 1100 to perform at least one operation. At least some operations of the method according to the embodiment of the present invention may be performed by the at least one processor 1100 that loads instructions from the memory 1200 and executes the instructions.

The processor 1100 may be a central processing unit (CPU), a graphics processing unit (GPU), or a dedicated processor on which the methods according to the embodiments of the present invention are performed.

Each of the memory 1200 and the storage device 1400 may include at least one of a volatile storage medium and a non-volatile storage medium. For example, the memory 1200 may include at least one of a read only memory (ROM) and a random-access memory (RAM).

Further, the computing system 1000 may include the communication interface 1300 that performs communication through a wireless network.

Further, the computing system 1000 may further include the storage device 1400, the input interface 1500, the output interface 1600, and the like.

Further, the components included in the computing system 1000 may each be connected to the bus 1700 to communicate with each other.

For example, the computing system 1000 according to the embodiment of the present invention may be a communicable device, such as a desktop computer, a laptop computer, a notebook computer, a smartphone, a tablet personal computer (PC), a mobile phone, a smart watch, smart glasses, an e-book reader, a portable multimedia player (PMP), a portable game device, a navigation device, a digital camera, a digital multimedia broadcasting (DMB) player, a digital audio recorder, a digital audio player, a digital video recorder, a digital video player, a personal digital assistant (PDA), or the like.

The peer included in the hybrid P2P network according to the embodiment of the present invention includes a memory 1200 for storing at least one instruction and a processor 1100 that executes the at least one instruction.

The processor 1100 may execute at least one instruction to perform an operation S310 of transmitting, as a first peer, a primary path setting message SET_PRIMARY for setting a primary path between the first peer and a second peer to the second peer, an operation S320 of receiving a response message to the primary path setting message SET_PRIMARY including information about a third peer, which is a parent peer of the second peer having a primary path relationship with the second peer, to the first peer, and operations S330, S340, and S350 of transmitting one or more messages (e.g., HELLO, ESTAB_PEER, and SET_CANDIDATE) for setting a vertical candidate path with the third peer between the first peer and the third peer using the information about the third peer.

The operation of transmitting the one or more messages between the first peer and the third peer may include an operation S330 of transmitting, by the first peer, a first message HELLO including a vertical candidate path parameter for the third peer to the third peer, and an operation S340 of transmitting, by the third peer, a second message (e.g., in response to HELLO and/or ESTAB_PEER) to the first peer in response to the first message.

The operation of transmitting the one or more messages between the first peer and the third peer may further include an operation S350 of transmitting a vertical candidate path setting message SET_CANDIDATE for setting the vertical candidate path with the third peer to the third peer when the first peer receives the second message.

In the second message ESTAB_PEER, a value of a field "allow-primary-req" related to the primary path may be set to a value corresponding to "negative" (e.g., "false") to prevent a loop between the first peer, the second peer, and the third peer from being formed.

The processor 1100 may execute at least one instruction to further perform an operation of terminating any one of a plurality of preset candidate paths to set the vertical candidate path between the first peer and the third peer when the first peer receives the second message ESTAB_PEER and candidate paths in a candidate path pool of the first peer are all occupied.

The processor 1100 may execute at least one instruction to further perform an operation of setting the vertical candidate path between the first peer and the third peer as a first-priority candidate of a new primary path for replacing the primary path between the first peer and the second peer in a case in which the second peer leaves the network or is expelled from the network.

The processor 1100 may execute at least one instruction to further perform an operation of sharing, by the second peer, the primary path setting message with one or more peers having a primary path relationship with the second peer.

In the operation of transmitting the primary path setting message to the second peer, the second peer from among one or more peers having candidate paths with the first peer may be determined as a counterpart peer on the primary path, and the primary path setting message SET_PRIMARY may be transmitted to the second peer.

The processor 1100 may execute at least one instruction to further perform an operation S420 of transmitting, by the third peer, the expulsion notification message EXPULSION_NOTIFICATION for the second peer received from OwnerPeer (S410) to the first peer and the second peer, an operation S422 of checking, by the first peer, whether the expulsion notification message EXPULSION_NOTIFICATION for the second peer has been redundantly received from the second peer, and an operation of transmitting, by the first peer, the expulsion notification message EXPULSION_NOTIFICATION for the second peer to all remaining peers among peers having a primary path relationship and a candidate path relationship with the first peer, except for peers on the path through which the expulsion notification message EXPULSION_NOTIFICATION for the second peer has already been transmitted.

The processor 1100 may execute at least one instruction to further perform an operation of selecting, by the first peer, the vertical candidate path between the first peer and the third peer as a new primary path that replaces the primary path between the first peer and the second peer and transmitting a second primary path setting message for setting the primary path between the first peer and the third peer to the third peer.

The processor 1100 may execute at least one instruction to further perform an operation of transmitting, by the third peer, a response message to the second primary path setting message including information about a fourth peer, which is a parent peer of the third peer having a primary path relationship with the third peer, to the first peer.

The processor 1100 may execute at least one instruction to perform an operation S310 of transmitting, by the first peer, a primary path setting message SET_PRIMARY for setting a primary path between the first peer and a second peer to the second peer, an operation S320 of receiving, by the first peer, a response message to the primary path setting message SET_PRIMARY from the second peer, and operations S330, S340, and S350 of transmitting, by the first peer, one or more messages (e.g., HELLO, ESTAB_PEER, and SET_CANDIDATE) for setting a vertical candidate path for a third peer to the third peer using information about the third peer, which is included in the response message and is a parent peer of the second peer having a primary path relationship with the second peer.

The operation of transmitting the one or more messages to the third peer may include an operation S330 of transmitting a first message HELLO including a vertical candidate path parameter for the third peer to the third peer, and an operation S340 of receiving a second message ESTAB_PEER from the third peer in response to the first message.

The operation of transmitting the one or more messages to the third peer may further include an operation S350 of transmitting a vertical candidate path setting message SET_CANDIDATE for setting the vertical candidate path with the third peer to the third peer when the first peer receives the second message.

The processor 1100 may execute at least one instruction to perform an operation of terminating any one of a plurality of preset candidate paths to set the vertical candidate path between the first peer and the third peer when the first peer receives the second message and candidate paths in a candidate path pool of the first peer are all occupied.

According to the embodiments of the present invention, a protocol that can solve problems that may occur in an entire service when a peer does not maliciously propagate data and messages to other peers can be implemented.

According to the embodiments of the present invention, a specific peer located inside a hybrid overlay network can be safely removed.

According to the embodiments of the present invention, it is possible to prevent an increase in data transmission path by restoring a lost path while maintaining a basic structure of a hierarchy and provide an efficient service.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of setting a path between peers included in a hybrid peer-to-peer (P2P) network, which is a path setting method performed in at least one peer included in the P2P network, comprising:
   transmitting, by a first peer, a primary path setting message for setting a primary path between the first peer and a second peer to the second peer;
   transmitting, by the second peer, a response message to the primary path setting message including information about a third peer, which is a parent peer of the second peer having a primary path relationship with the second peer, to the first peer; and
   transmitting one or more messages for setting a vertical candidate path with the third peer between the first peer and the third peer using the information about the third peer,
   wherein the transmitting of the one or more messages between the first peer and the third peer includes:
   transmitting, by the first peer, a first message including a vertical candidate path parameter with the third peer to the third peer; and
   transmitting, by the third peer, a second message to the first peer in response to the first message,
   wherein, in the second message, a value of a field related to the primary path is set to a value corresponding to "negative" to prevent a loop between the first peer, the second peer, and the third peer from being formed.

2. The method of claim 1, wherein the transmitting of the one or more messages between the first peer and the third peer further includes, when the first peer receives the second message, transmitting a vertical candidate path setting message for setting the vertical candidate path with the third peer to the third peer.

3. The method of claim 1, further comprising, when the first peer receives the second message and all of candidate paths in a candidate path pool of the first peer are occupied, terminating one with a peer having a highest ticket-id among of a plurality of preset candidate paths to set the vertical candidate path between the first peer and the third peer.

4. The method of claim 1, further comprising setting the vertical candidate path between the first peer and the third peer as a first-priority candidate of a new primary path for replacing the primary path between the first peer and the second peer in a case in which the second peer leaves the network or is expelled from the network.

5. The method of claim 1, further comprising sharing, by the second peer, the primary path setting message with one or more peers having the primary path relationship with the second peer.

6. The method of claim 1, wherein, in the transmitting of the primary path setting message to the second peer, the second peer from among one or more peers having candidate paths with the first peer is determined as a counterpart peer on the primary path, and the primary path setting message is transmitted to the second peer.

7. The method of claim 1, further comprising:
transmitting, by the third peer, an expulsion notification message for the second peer to the first peer and the second peer;
checking, by the first peer, whether the expulsion notification message for the second peer has been redundantly received from the second peer based on a number of the expulsion notification message for the second peer;
when it is determined that the expulsion notification message is a normal message and is not received redundantly, updating, by the first peer, the sequence number of the expulsion notification message to a latest sequence number and storing the latest sequence number; and
transmitting, by the first peer, the expulsion notification message for the second peer to all remaining peers among peers having a primary path relationship and a candidate path relationship with the first peer, except for peers on the path through which the expulsion notification message for the second peer has already been transmitted.

8. The method of claim 7, further comprising selecting, by the first peer, the vertical candidate path between the first peer and the third peer as a new primary path that replaces the primary path between the first peer and the second peer and transmitting a second primary path setting message for setting the primary path between the first peer and the third peer to the third peer.

9. The method of claim 8, further comprising transmitting, by the third peer, a response message to the second primary path setting message including information about a fourth peer, which is a parent peer of the third peer having a primary path relationship with the third peer, to the first peer.

10. A method of setting a path between peers included in a hybrid peer-to-peer (P2P) network, which is a path setting method performed in a peer included in the P2P network, comprising:
transmitting, by a first peer, a primary path setting message for setting a primary path between the first peer and a second peer to the second peer;
receiving, by the first peer, a response message to the primary path setting message from the second peer; and
transmitting, by the first peer, one or more messages for setting a vertical candidate path with a third peer to the third peer using information about the third peer included in the response message, wherein the third peer is a parent peer of the second peer having a primary path relationship with the second peer;
receiving, by the first peer, an expulsion notification message for the second peer from the third peer;
checking, by the first peer, whether the expulsion notification message for the second peer has been redundantly received from the second peer; and
transmitting, by the first peer, the expulsion notification message for the second peer to all remaining peers among peers having a primary path relationship and a candidate path relationship with the first peer, except for peers on the path through which the expulsion notification message for the second peer has already been transmitted.

11. The method of claim 10, wherein the transmitting of the one or more messages to the third peer includes:
transmitting a first message including a vertical candidate path parameter with the third peer to the third peer; and
receiving a second message from the third peer in response to the first message.

12. The method of claim 11, wherein the transmitting of the one or more messages to the third peer further includes, when the first peer receives the second message, transmitting a vertical candidate path setting message for setting the vertical candidate path with the third peer to the third peer.

13. The method of claim 11, further comprising, when the first peer receives the second message and all of candidate paths in a candidate path pool of the first peer are occupied, terminating any one of a plurality of preset candidate paths to set the vertical candidate path between the first peer and the third peer.

14. A method of setting a path between peers included in a hybrid peer-to-peer (P2P) network, which is a path setting method performed in at least one peer included in the P2P network, comprising:
transmitting, by a first peer, a primary path setting message for setting a primary path between the first peer and a second peer to the second peer;
transmitting, by the second peer, a response message to the primary path setting message including information about a third peer, which is a parent peer of the second peer having a primary path relationship with the second peer, to the first peer; and
transmitting one or more messages for setting a vertical candidate path with the third peer between the first peer and the third peer using the information about the third peer;
transmitting, by the third peer, an expulsion notification message for the second peer to the first peer and the second peer;
checking, by the first peer, whether the expulsion notification message for the second peer has been redundantly received from the second peer based on a number of the expulsion notification message for the second peer;
when it is determined that the expulsion notification message is a normal message and is not received redundantly, updating, by the first peer, the sequence number of the expulsion notification message to a latest sequence number and storing the latest sequence number; and
transmitting, by the first peer, the expulsion notification message for the second peer to all remaining peers among peers having a primary path relationship and a candidate path relationship with the first peer, except for peers on the path through which the expulsion notification message for the second peer has already been transmitted.

\* \* \* \* \*